(12) United States Patent
Hashiba

(10) Patent No.: US 7,508,106 B2
(45) Date of Patent: Mar. 24, 2009

(54) MAGNETOELECTRIC GENERATOR

(75) Inventor: Mitsuharu Hashiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 512 days.

(21) Appl. No.: 11/331,089

(22) Filed: Jan. 13, 2006

(65) Prior Publication Data
US 2007/0096576 A1 May 3, 2007

(30) Foreign Application Priority Data
Nov. 2, 2005 (JP) .............................. 2005-319756

(51) Int. Cl.
*H02K 21/22* (2006.01)
(52) U.S. Cl. ............................. 310/156.38; 310/156.26; 29/598
(58) Field of Classification Search ............ 310/156.38, 310/156.26, 43, 156.21, 156.23, 156.19, 310/67 R, 153; 29/598
See application file for complete search history.

(56) References Cited

U.S. PATENT DOCUMENTS

| | | | |
|---|---|---|---|
| 4,150,616 A * | 4/1979 | Schneider et al. | ............. 100/35 |
| 6,396,177 B1 | 5/2002 | Shin et al. | |
| 2006/0117542 A1 * | 6/2006 | Katsibardis et al. | ...... 29/407.05 |

FOREIGN PATENT DOCUMENTS

| | | |
|---|---|---|
| EP | 0 895 335 A2 | 2/1999 |
| JP | 61-236350 A | 10/1986 |
| JP | 09-163652 A | 6/1997 |
| JP | 2002-101630 A | 4/2002 |
| JP | 2002101630 A | 4/2002 |
| JP | 2003-088060 A | 3/2003 |
| JP | 2003-164086 A | 6/2003 |
| JP | 2004-282912 A | 10/2004 |

* cited by examiner

*Primary Examiner*—Gary F. Paumen
(74) *Attorney, Agent, or Firm*—Sughrue Mion, PLLC

(57) ABSTRACT

In a magnetoelectric generator generating electric power by electromagnetic induction between permanent magnets and a generating coil due to rotation of a flywheel, a plurality of press-worked portions for forcibly increasing roundness of the flywheel are formed by press working on a bottom portion of the flywheel.

16 Claims, 8 Drawing Sheets

MAGNETOELECTRIC GENERATOR

BACKGROUND OF THE INVENTION

1. Field of the Invention

The present invention relates to a magnetoelectric generator for generating electric power by electromagnetic induction between a permanent magnet and a generating coil due to rotation of a flywheel.

2. Description of the Related Art

Conventionally, magnetoelectric generators are known in which a plurality of permanent magnets are fixed to an inner peripheral wall surface of a cylindrical portion of a bowl-shaped flywheel so as to be arranged circumferentially, and the permanent magnets are fixed integrally to the flywheel by filling a resin material between adjacent permanent magnets (See Patent Literature 1, for example).

In these magnetoelectric generators, a plurality of protruding-portions projecting inward are formed on the cylindrical portion of the flywheel by press working, and the resin material is engaged by these protruding portions to prevent the resin material and the permanent magnets from moving relative to the flywheel.

Patent Literature 1

Japanese Patent Laid-Open No. 2002-101630 (Gazette: Page 5; FIGS. 1 and 2)

In the flywheels of conventional magnetoelectric generators, a bar-shaped material is machined into a bowl shape, then press working is applied to form the protruding portions, but roundness of the flywheel deteriorates during this press working, as shown in FIG. 5, giving rise to irregularities in an amount of air gap between the permanent magnets and a stator.

In particular, since flywheels are being made thinner in magnetoelectric generators with a view to reducing size and weight, deterioration in roundness of the flywheel as the protruding portions are being formed on the cylindrical portion by press working has become marked, and due to increases in irregularities in the amount of air gap resulting from press working, problems such as the following have arisen:

A) Fluctuations arise in the rotational locus of the rotating flywheel and adversely affect power generating characteristics (output characteristics);

B) Sliding friction arises between inner peripheral surfaces of the permanent magnets and outer peripheral surfaces of the stator, possibly preventing completion of manufacture; and C) Temperature differences may also arise in generating coils of the stator due to power generating effects (alternating magnetic field) from increases and decreases in the amount of air gap, reducing service life and reliability of an electrically-insulating coating (a polymeric material) on conducting wires in a portion of the generating coils due to extreme temperature increases.

SUMMARY OF THE INVENTION

The present invention aims to solve the above problems and an object of the present invention is to provide a magnetoelectric generator enabling an amount of air gap between permanent magnets and a stator to be made uniform by improving roundness of a bowl-shaped flywheel, thereby enabling reductions in the amount of air gap and improving power generating characteristics, etc.

In order to achieve the above object, according to one aspect of the present invention, there is provided a magnetoelectric generator including: a bowl-shaped flywheel having a cylindrical portion and a bottom portion; a plurality of permanent magnets fixed to an inner peripheral wall surface of the cylindrical portion so as to be arranged circumferentially; a resin material filled between adjacent pairs of the permanent magnets, the resin material fixing the permanent magnets integrally to the flywheel; a stator core disposed radially inside the flywheel such that an outer peripheral surface of the stator core faces the permanent magnets; and a generating coil configured by winding a conducting wire onto the stator core, the magnetoelectric generator generating electric power by electromagnetic induction between the permanent magnets and the generating coil due to rotation of the flywheel, wherein: a plurality of press-worked portions for forcibly increasing roundness of the flywheel are formed by press working on the bottom portion of the flywheel.

The magnetoelectric generator according to the present invention enables an amount of air gap between the permanent magnets and the stator to be made uniform by improving roundness of the bowl-shaped flywheel, thereby enabling reductions in the amount of air gap and improving power generating characteristics, etc.

DETAILED DESCRIPTION OF THE PREFERRED EMBODIMENTS

Figure 1:
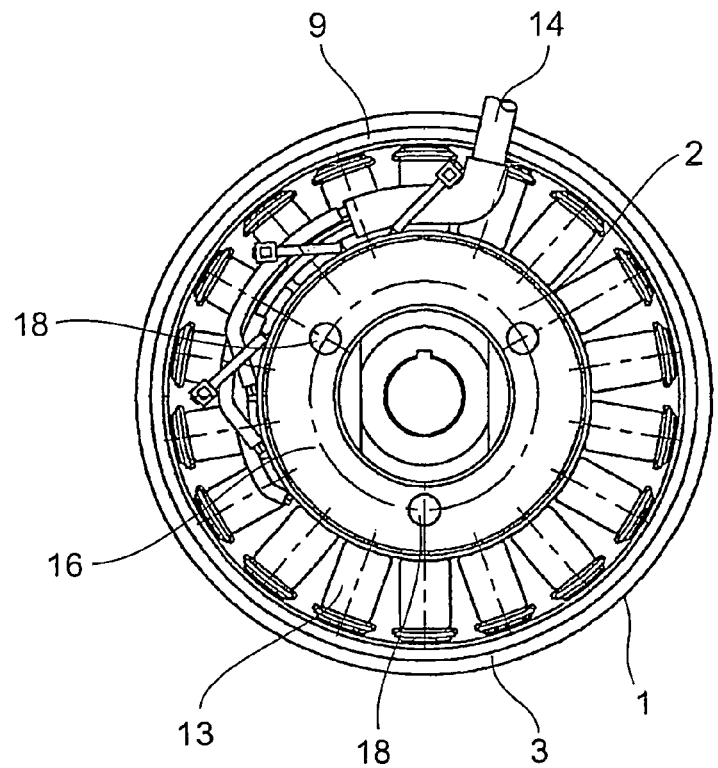
FIG. 1 is a front elevation showing a magnetoelectric generator according to Embodiment 1 of the present invention.

Preferred embodiments of the present invention will now be explained based on drawings, and identical or corresponding members and portions in the drawings will be given identical numbering.

Embodiment 1

Figure 2:
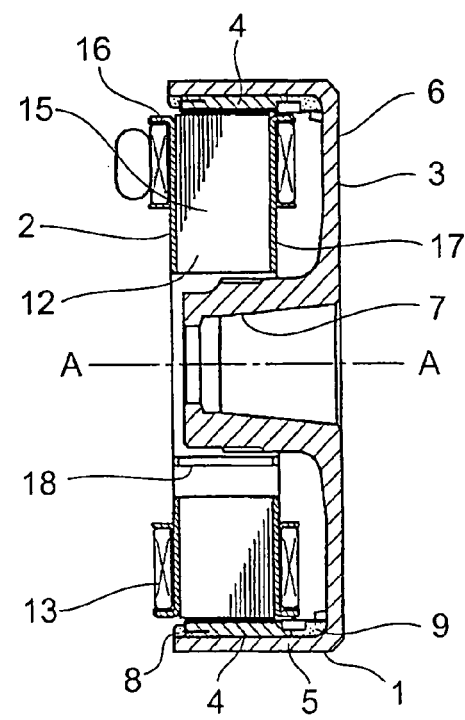
FIG. 2 is a cross section of the magnetoelectric generator in FIG. 1.
Figure 3:
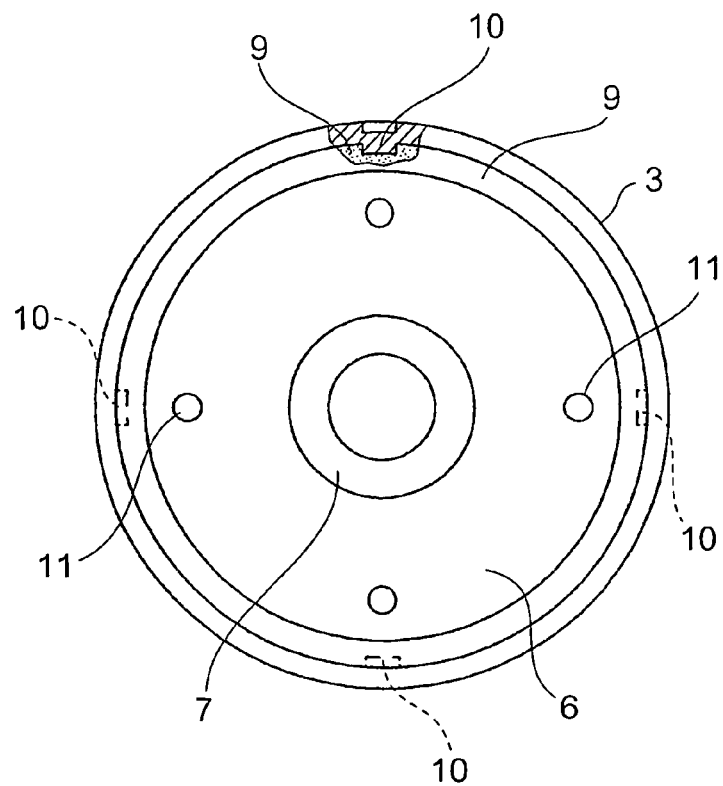
FIG. 3 is a front elevation including a cut-away cross section of a portion of a flywheel from FIG. 1.
Figure 4:
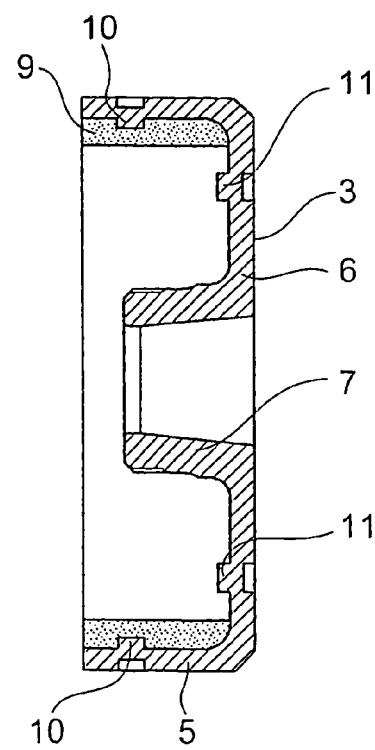
FIG. 4 is a cross section of the flywheel in FIG. 3.

FIG. 1 is a front elevation showing a magnetoelectric generator according to Embodiment 1 of the present invention, FIG. 2 is a cross section of FIG. 1, FIG. 3 is a front elevation including a cut-away cross section of a portion of a flywheel from FIG. 1, and FIG. 4 is a cross section of FIG. 3.

This magnetoelectric generator includes: a rotor 1 linked to an internal combustion engine; and a stator 2 mounted to a fixing member (not shown) so as to face the rotor 1.

The rotor 1 includes: a bowl-shaped flywheel 3; and permanent magnets 4.

The flywheel 3 is constituted by: a cylindrical portion 5; a boss portion 7; and a bottom portion 6 connecting the boss portion 7 and the cylindrical portion 5. The flywheel 3 rotates around an axis of rotation A-A. The boss portion 7 is fixed to a rotating shaft (not shown) which is driven to rotate by the internal combustion engine.

Four permanent magnets 4, for example, are fixed to an inner peripheral wall surface of the cylindrical portion 5 of the flywheel 3. The permanent magnets 4 are disposed at a uniform angular pitch from each other around the axis of rotation A-A such that two magnets magnetized in order of a North-seeking (N) pole, a South-seeking (S) pole, and a North-seeking (N) pole and two magnets magnetized in order of a South-seeking (S) pole, a North-seeking (N) pole, and a South-seeking (S) pole alternate with each other. The plurality of permanent magnets 4 are magnetized such that adjacent permanent magnets 4 have reverse polarity to each other such that a magnetic field that alternately changes in direction is generated in a space at an inner periphery of the permanent magnets 4.

A tubular protective ring 8 is inserted so as to be placed in close contact with inner peripheral surfaces of each of the permanent magnets 4. Regions near two end portions of each of the permanent magnets 4 in a direction of the axis of rotation A-A and circumferential spaces between each of the adjacent permanent magnets 4 are filled with a resin material 9. The plurality of permanent magnets 4 and the protective ring 8 are fixed to the inner peripheral wall surface of the cylindrical portion 5 of the flywheel 3 by the resin material 9.

Protruding portions 10 constituting retaining portions for preventing displacement relative to the resin material 9 are formed by press working at a uniform pitch at four positions on the cylindrical portion 5 of the flywheel 3 between adjacent permanent magnets 4.

Press-worked portions 11 for forcibly increasing roundness of the flywheel 3 are formed at four positions at a uniform pitch on the bottom portion 6 in a vicinity of the protruding portions 10 by press working.

The stator 2 includes: a hollow cylindrical stator core 12; and generating coils 13. A plurality of teeth projecting radially outward in a radial pattern at a uniform pitch are formed on an outer peripheral portion of the stator core 12. The generating coils 13 are configured by winding a conducting wire onto side surfaces of each of the teeth. Connecting leads 14 are connected to the generating coils 13.

The stator core 12 is constituted by: a laminated core 15 configured by laminating a large number of open-centered thin magnetic steel sheets constituting cold-rolled steel sheets in a direction of the axis of rotation A-A; and a first end plate 16 and a second end plate 17 respectively stacked in close contact with two respective end surfaces of the laminated core 15.

The first end plate 16 and the second end plate 17 are constituted by cold-rolled steel sheets, and outer peripheral edge portions of the first end plate 16 and the second end plate 17 are bent toward the generating coils 13 in order to hold the generating coils 13.

Penetrating apertures 18 passing through parallel to the axis of rotation A-A are formed at three positions on the laminated core 15, the first end plate 16, and the second end plate 17. The laminated core 15, the first end plate 16, and the second end plate 17 are integrated with the first end plate 16 and the second end plate 17 placed in close contact on the two end surfaces of the laminated core 15 by bolts (not shown) passed through the penetrating apertures 18 and nuts (not shown) screwed onto end portions of the bolts.

In a magnetoelectric generator having the above configuration, the flywheel 3 rotates interdependently with the rotating shaft that is driven to rotate by the internal combustion engine, and as it does so electric power is generated in the generating coils 13 due to the alternating magnetic field generated by the permanent magnets 4. The resulting alternating-current output is rectified by rectifying diodes (not shown), and is supplied to a load such as a vehicle battery, etc.

Now, the resin material 9 and the permanent magnets 4 are prevented from moving relative to the flywheel 3 by forming the protruding portions 10 constituting retaining portions on the cylindrical portion 5 of the flywheel 3, and engaging the resin material 9 in the protruding portions 10.

Figure 5:
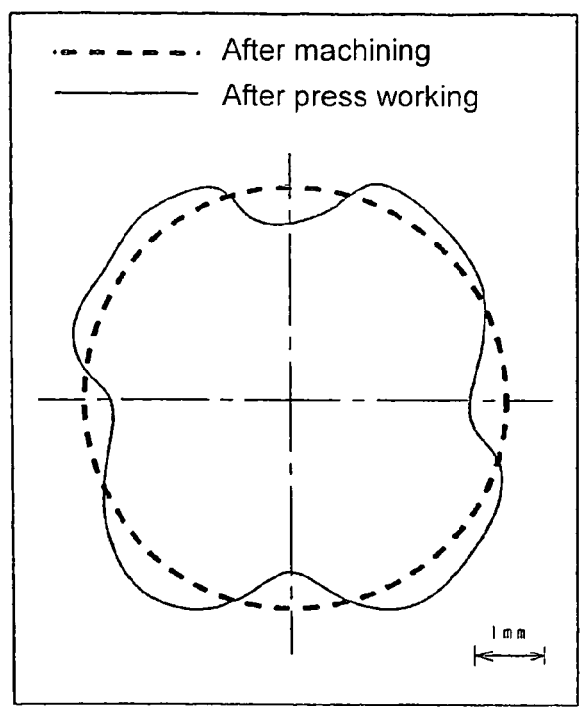
FIG. 5 is a graph showing roundness of a conventional flywheel.

However, after the protruding portions 10 are formed by press working, radially-inward concave deformation occurs in a vicinity of the protruding portions 10 due to the press working, as shown in FIG. 5.

Figure 6:
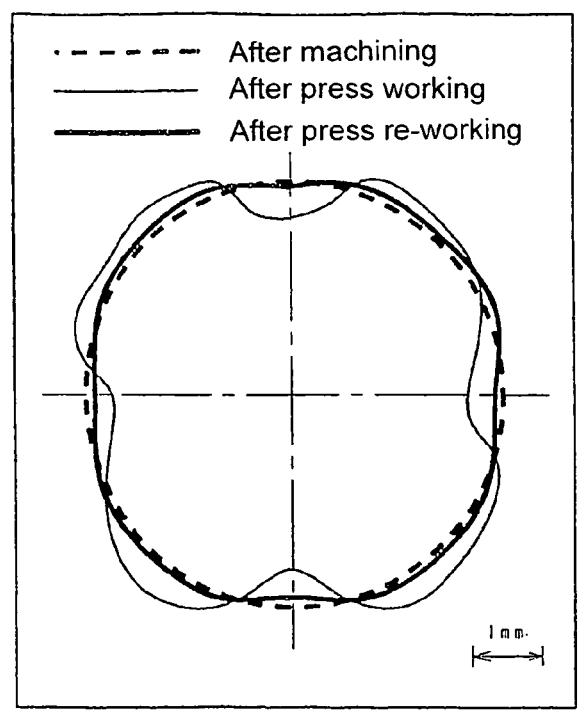
FIG. 6 is a graph showing roundness of the flywheel in FIG. 1.

In this embodiment, after the press working, a plurality of press-worked portions 11 are formed on the bottom portion 6 in a vicinity of the protruding portions 10 by applying press working from an opposite side of the bottom portion 6 from the stator 2 to increase the roundness of the flywheel 3 forcibly as shown in FIG. 6.

Figure 7:
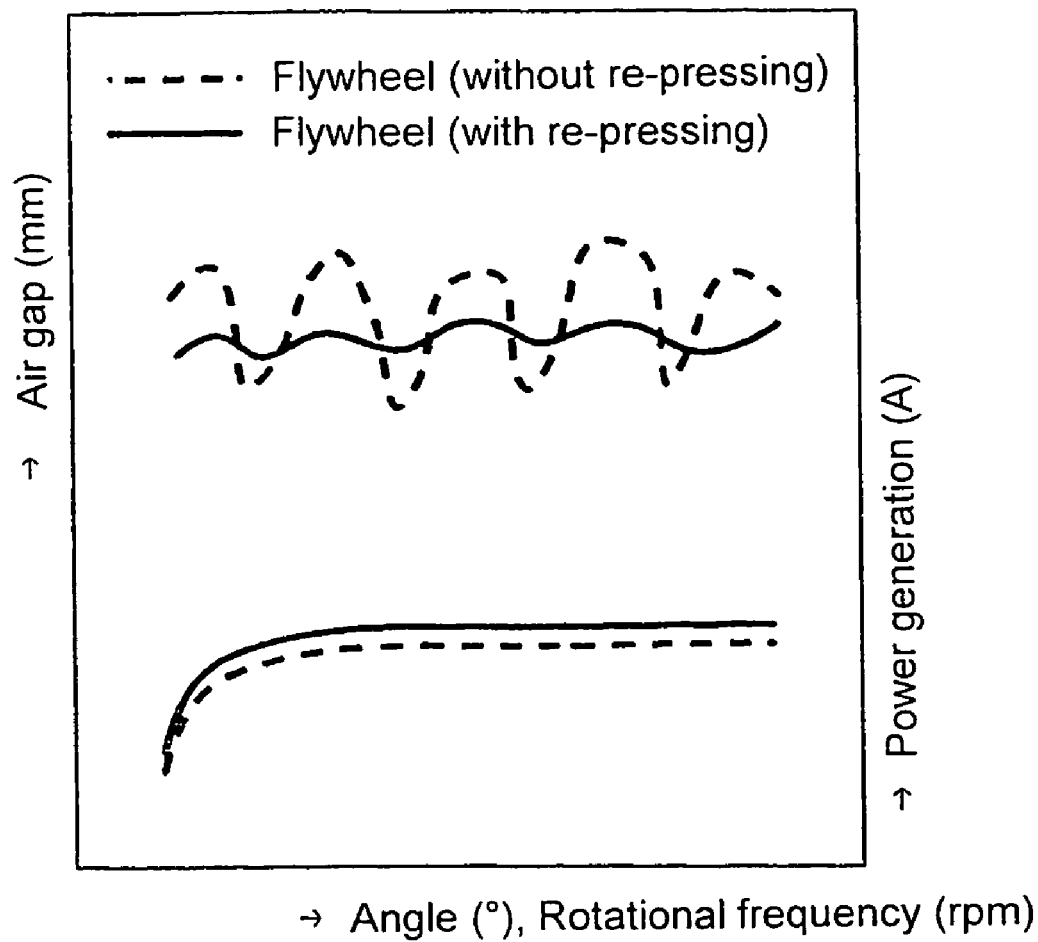
FIG. 7 is a graph showing air gap and power generating characteristics of flywheels due to presence or absence of a press-worked portion.

FIG. 7 shows a relationship between a circumferential angle of the stator 2 and an air gap (between the stator 2 and the permanent magnets 4) and a relationship between rotational frequency (rpm) of the rotor 1 and power generating characteristics (output current properties) of the generating coils 13 in a comparison between a magnetoelectric generator according to Embodiment 1 and a conventional magnetoelectric generator, and was obtained by the present inventors by conducting experiments.

From these experimental results, when the above relationship between angle (horizontal axis in FIG. 7) and air gap (vertical axis in FIG. 7) is examined, it can be seen that irregularities in the air gap are reduced significantly in a magnetoelectric generator according to Embodiment 1 compared to conventional magnetoelectric generators.

It can also be seen that fluctuations in the rotational locus of the rotating flywheel 3 are reduced due to the reduction in irregularities in the air gap, improving power generating characteristics (output characteristics) compared to conventional magnetoelectric generators.

In a magnetoelectric generator according to this embodiment, as can be seen from the above experimental results, power generating characteristics are improved by enabling the amount of air gap to be made uniform, and it becomes possible to reduce the amount of air gap in size, further enabling power generating characteristics to be improved.

Sliding friction between inner peripheral surfaces of the permanent magnets 4 and outer peripheral surfaces of the stator 2 can also be prevented.

Deterioration in service life and reliability of the electrically-insulating coating on the conducting wires, which is a polymeric material, due to extreme temperature increases in portions of the generating coils 13 can also be prevented.

Embodiment 2

Figure 8:
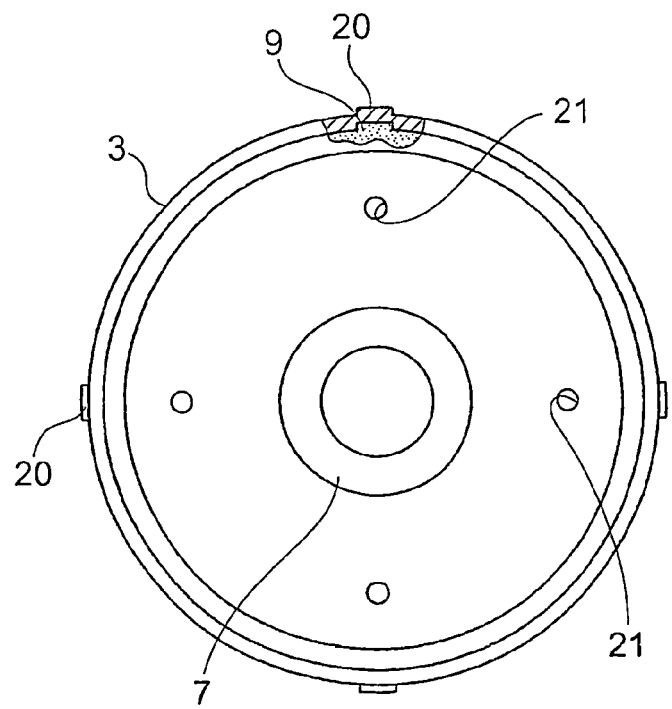
FIG. 8 is a front elevation including a cut-away cross section of a portion of a flywheel in a magnetoelectric generator according to Embodiment 2.
Figure 9:
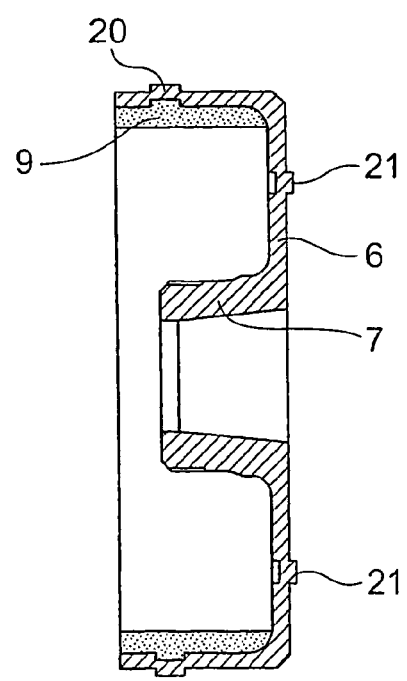
FIG. 9 is a cross section of the flywheel in FIG. 8.

FIG. 8 is a front elevation including a cut-away cross section of a portion of a flywheel in a magnetoelectric generator according to Embodiment 2, and FIG. 9 is a cross section of the flywheel in FIG. 8.

In this embodiment, protruding portions 20 constituting retaining portions projecting radially outward are formed by press working from an inner peripheral wall surface of a cylindrical portion 5.

Press-worked portions 21 for forcibly increasing roundness of a flywheel 3 are formed at four positions at a uniform pitch on a bottom portion 6 in a vicinity of the protruding portions 20 by press working from a surface of the bottom portion 6 on a side near a stator 2.

The rest of the configuration is similar to that of the magnetoelectric generator according to Embodiment 1, and similar effects to those in Embodiment 1 above can be achieved.

Embodiment 3

Figure 10:
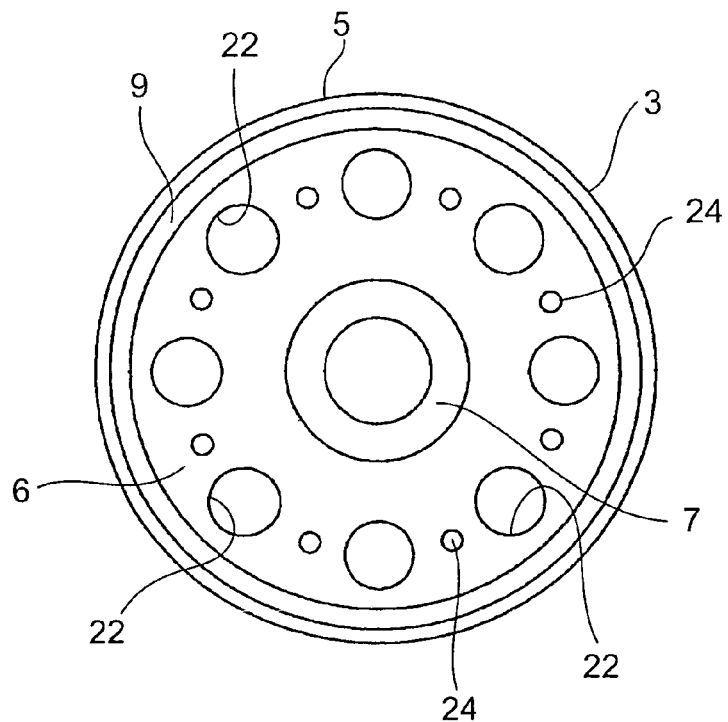
FIG. 10 is a front elevation showing a flywheel in a magnetoelectric generator according to Embodiment 3.
Figure 11:
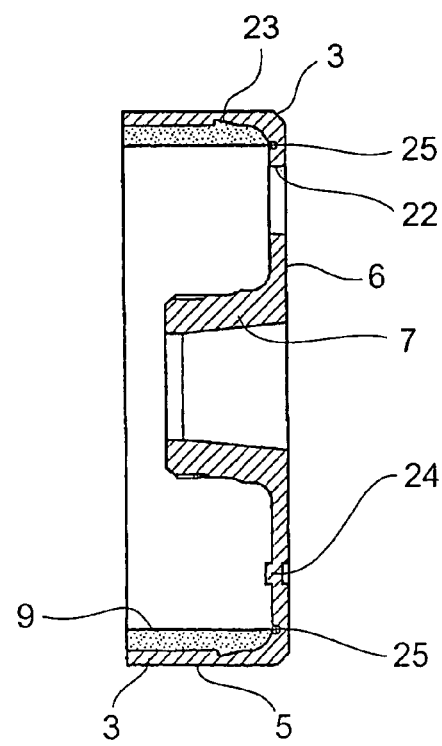
FIG. 11 is a cross section of the flywheel in FIG. 10.

FIG. 10 is a front elevation showing a flywheel 3 in a magnetoelectric generator according to Embodiment 3, and FIG. 11 is a cross section of the flywheel 3 in FIG. 10.

In this embodiment, a plurality of ventilating apertures 22 are formed on a bottom portion 6 of a flywheel 3. Press-worked portions 24 for forcibly increasing roundness of the flywheel 3 are formed between adjacent ventilating apertures 22 by press working from a surface of the bottom portion 6 on an opposite side from the stator 2. Swivel-stopping grooves 25 for preventing a resin material 9 from rotating relative to the flywheel 3 are formed at four positions at a uniform pitch at a peripheral edge portion on a surface of the bottom portion 6 on a side near the stator 2.

A dislodgment-preventing groove 23 for preventing the resin material 9 from dislodging axially is formed around an entire circumference on an inner peripheral wall surface of a cylindrical portion 5.

Because the dislodgment-preventing groove 23 and the swivel-stopping grooves 25 are formed on this flywheel 3, protruding portions 10 such as those shown in Embodiment 1 or protruding portions 20 such as those shown in Embodiment 2 are unnecessary.

However, in the case of this configuration, since pressing forces also act radially inward on the cylindrical portion 5 of the flywheel 3 during lathe chucking in the manufacturing process for the flywheel 3, radially-inward concave deformation occurs in a similar manner to that shown in FIG. 5. Deterioration in the roundness of the flywheel 3 due to chucking is particularly marked if the flywheel 3 was made thinner in order to reduce weight.

Consequently, in this embodiment, the press-worked portions 24 are formed on the bottom portion 6 after lathe chucking by applying press working from an opposite side of the bottom portion 6 from the stator 2 to increase the roundness of the flywheel 3 forcibly.

Embodiment 4

Figure 12:
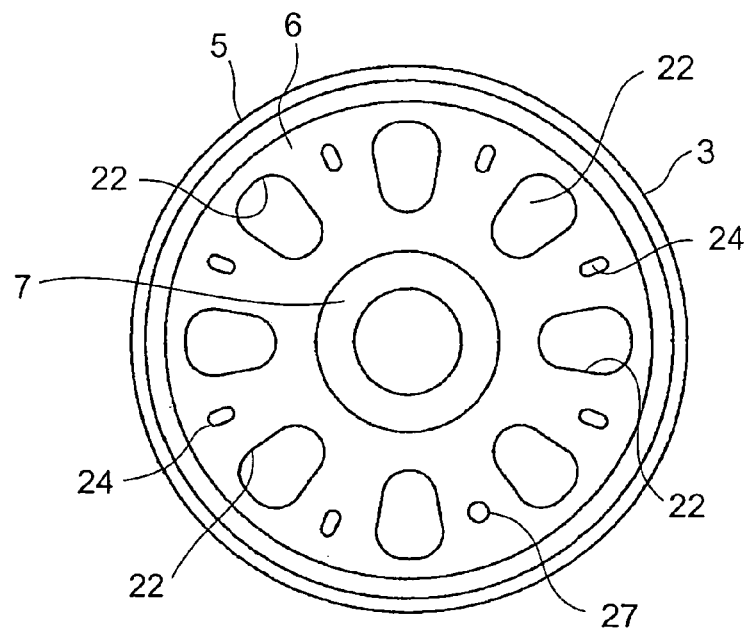
FIG. 12 is a front elevation showing a flywheel in a magnetoelectric generator according to Embodiment 4.
Figure 13:
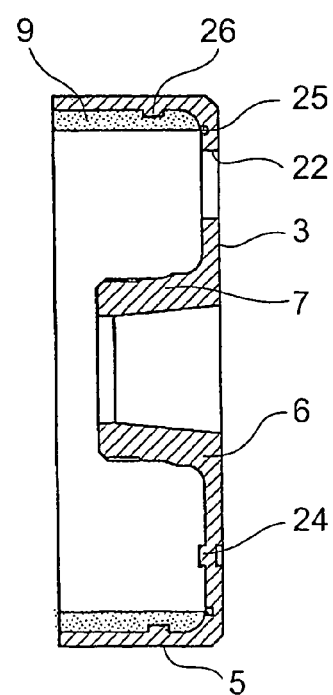
FIG. 13 is a cross section of the flywheel in FIG. 12.

FIG. 12 is a front elevation showing a flywheel 3 in a magnetoelectric generator according to Embodiment 4, and FIG. 13 is a cross section of the flywheel 3 in FIG. 12.

In this embodiment, a bottom portion 6 of a flywheel 3 is work-hardened by press working the entire bottom portion 6 using a disk-shaped pressing member so as to increase rigidity of the bottom portion 6 of the flywheel 3. A dislodgment-preventing protrusion 26 for preventing a resin material 9 from dislodging axially is formed around an entire circumference of an inner peripheral wall surface of a cylindrical portion 5.

Among a plurality of press-worked portions 24, just one press-worked portion 27 is formed so as to have a different shape.

The rest of the configuration is similar to that of the magnetoelectric generator according to Embodiment 3.

Because the dislodgment-preventing protrusion 26 and the swivel-stopping grooves 25 are formed on this flywheel 3, protruding portions 10 such as those shown in Embodiment 1 or protruding portions 20 such as those shown in Embodiment 2 are unnecessary, in a similar manner to Embodiment 3.

However, in the case of this configuration, pressing forces also act radially inward on the cylindrical portion 5 of the flywheel 3 during lathe chucking in the manufacturing process for the flywheel 3, and radially-inward concave deformation occurs in a similar manner to that shown in FIG. 5.

Radially-inward concave deformation also occurs in a similar manner to that shown in FIG. 5 during work hardening of the bottom portion 6 by press working the entire bottom portion 6 of the flywheel 3.

Consequently, in this embodiment, the press-worked portions 24 are formed on the bottom portion 6 after lathe chucking and press working by applying press working from an opposite side of the bottom portion 6 from the stator 2 to increase the roundness of the flywheel 3 forcibly.

Because the press-worked portion 27 is formed so as to have a different shape than the other press-worked portions 24, this press-worked portion 27 can be used for a reference for positioning the permanent magnets 4, for example.

Embodiment 5

Figure 14:
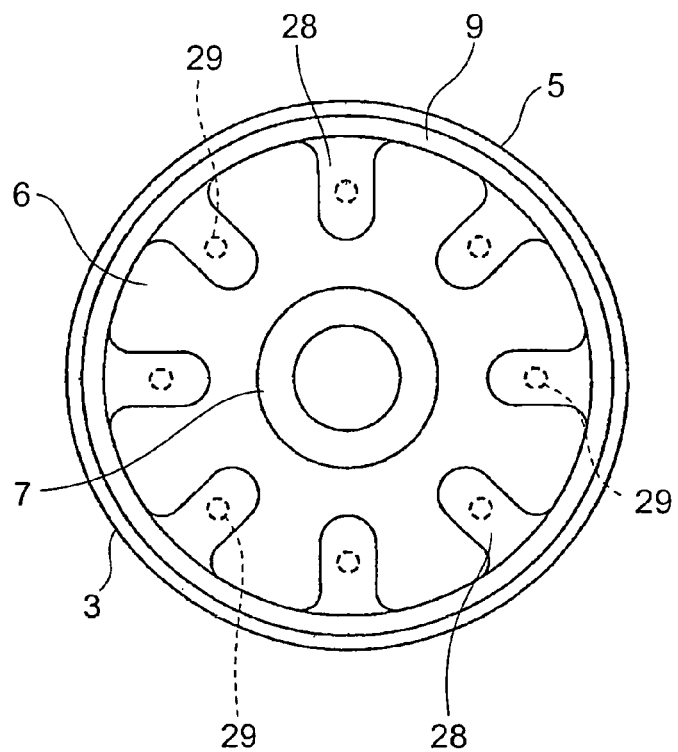
FIG. 14 is a front elevation showing a flywheel in a magnetoelectric generator according to Embodiment 5.
Figure 15:
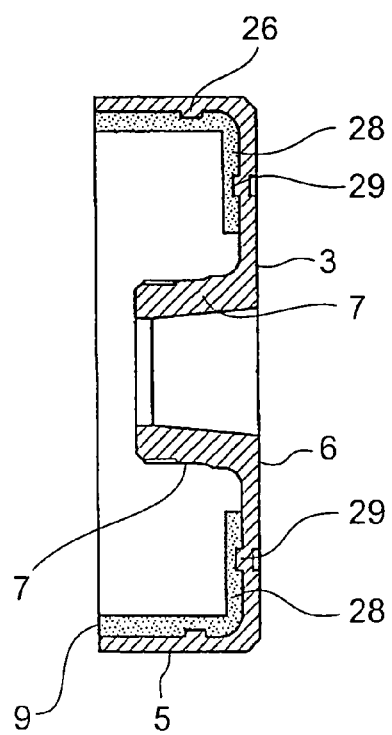
FIG. 15 is a cross section of the flywheel in FIG. 14.

FIG. 14 is a front elevation showing a flywheel 3 in a magnetoelectric generator according to Embodiment 5, and FIG. 15 is a cross section of the flywheel 3 in FIG. 14.

In this embodiment, cooling fins 28 connected to a resin material 9 and projecting radially inward from the resin material 9 are disposed on a surface of a bottom portion 6 of a flywheel 3. Press-worked portions 29 for preventing the resin material 9 and the cooling fins 28 from rotating relative to the flywheel 3 and for forcibly increasing roundness of the flywheel 3 are formed on the bottom portion 6.

A dislodgment-preventing protrusion 26 for preventing the resin material 9 and the cooling fins 28 from dislodging axially is formed around an entire circumference of an inner peripheral wall surface of a cylindrical portion 5.

In this embodiment, the press-worked portions 29 are formed after lathe chucking by applying press working from a surface on an opposite side of the bottom portion 6 from a stator 2 to increase the roundness of the flywheel 3 forcibly.

The press-worked portions 29 also have a swivel-stopping action preventing the resin material 9 and the cooling fins 28 from rotating relative to the flywheel 3.

What is claimed is:

1. A magnetoelectric generator comprising:
a bowl-shaped flywheel having a cylindrical portion and a bottom portion;
a plurality of permanent magnets fixed to an inner peripheral wall surface of said cylindrical portion so as to be arranged circumferentially;

a resin material filled between adjacent pairs of said permanent magnets, said resin material fixing said permanent magnets integrally to said flywheel;

a stator core disposed radially inside said flywheel such that an outer peripheral surface of said stator core faces said permanent magnets; and a generating coil configured by winding a conducting wire onto said stator core, said magnetoelectric generator generating electric power by electromagnetic induction between said permanent magnets and said generating coil due to rotation of said flywheel, wherein:

a plurality of press-worked protrusions, which forcibly increase roundness of said flywheel, are formed by press working on said bottom portion of said flywheel.

2. The magnetoelectric generator according to claim 1, wherein:

a retaining portion for preventing displacement relative to said resin material is formed on said cylindrical portion by press working.

3. The magnetoelectric generator according to claim 1, wherein:

said bottom portion is work-hardened by press working; and a ventilating aperture is formed on said bottom portion.

4. The magnetoelectric generator according to claim 1, wherein:

a cooling fin connected to said resin material and projecting radially inward from said resin material is disposed on said bottom portion.

5. The magnetoelectric generator according to claim 1, wherein:

at least one press-worked protrusion has a different shape from other press-worked protrusions among said press-worked protrusions.

6. The magnetoelectric generator according to claim 1, wherein the plurality of protrusions are formed at a uniform pitch on said bottom portion of said flywheel.

7. The magnetoelectric generator according to claim 1, further comprising a plurality of retaining portions formed by press-working and wherein the plurality of protrusions are formed in a vicinity of the retaining portions.

8. The magnetoelectric generator according to claim 7, wherein for each of the retaining portions, a corresponding protrusion from the plurality of protrusions is provided in a vicinity of the retaining portion.

9. The magnetoelectric generator according to claim 1, where the protrusions protrude inward by applying press working on a surface of said bottom portion of the flywheel on a side opposite from a stator.

10. The magnetoelectric generator according to claim 1, wherein the protrusions protrude outward by press working from a surface of the bottom portion of said flywheel on a side near a stator.

11. The magnetoelectric generator according to claim 10, further comprising a plurality of retaining portions formed by press working, wherein the plurality of retaining portions project radially outward from an inner peripheral wall surface of the cylindrical portion of the flywheel.

12. The magnetoelectric generator according to claim 1, further comprising a plurality of ventilating apertures formed on said bottom portion of the flywheel, wherein the plurality of protrusions are formed between the plurality of ventilating apertures by press working from a surface of said bottom of said flywheel on a side opposite from a stator.

13. The magnetoelectric generator according to claim 1, further comprising a plurality of swivel stopping grooves at uniform pitch at a peripheral edge portion on a surface of said bottom portion on a side near a stator, wherein the plurality of swivel stopping grooves prevent the resin material from rotating relative to said flywheel.

14. The magnetoelectric generator according to claim 13, further comprising a dislodgement-preventing groove formed around an entire circumference on an inner peripheral wall surface of the cylindrical portion of the flywheel, wherein the dislodgement-preventing groove prevents the resin material from dislodging axially.

15. A method for creating a round bowl-shaped flywheel of a magnetoelectric generator comprising:

machining material into a bowl-shaped flywheel;

press working the bowl-shaped flywheel to form retaining portions; and re-press working a bottom portion of the flywheel to form protrusions.

16. The method according to claim 15, wherein when the retaining portions are formed, roundness of the flywheel deteriorates and wherein, when the protrusions are formed, said deterioration is corrected.

* * * * *